United States Patent
Tzomik et al.

(10) Patent No.: US 10,759,145 B2
(45) Date of Patent: *Sep. 1, 2020

(54) LAMINATES

(71) Applicant: HP Indigo B.V., Amstelveen (NL)

(72) Inventors: Inna Tzomik, Modiin (IL); Daniel Skvirsky, Nes Ziona (IL); Hannoch Ron, Kadima (IL); Yaniv Kachlon, Nes Ziona (IL); Gleb Romantcov, Nes Ziona (IL); Faina Kogan, Nes Ziona (IL); Raia Slivniak, Lod (IL); Sergio Brandriss, Rehovot (IL); Alexander Stolov, Nes Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/751,030

(22) PCT Filed: Oct. 23, 2015

(86) PCT No.: PCT/EP2015/074593
§ 371 (c)(1),
(2) Date: Feb. 7, 2018

(87) PCT Pub. No.: WO2017/067604
PCT Pub. Date: Apr. 27, 2017

(65) Prior Publication Data
US 2018/0229474 A1 Aug. 16, 2018

(51) Int. Cl.
*B32B 7/14* (2006.01)
*B32B 27/08* (2006.01)
(Continued)

(52) U.S. Cl.
CPC ............ *B32B 7/14* (2013.01); *B32B 15/00* (2013.01); *B32B 15/04* (2013.01); *B32B 15/08* (2013.01);
(Continued)

(58) Field of Classification Search
None
See application file for complete search history.

(56) References Cited

U.S. PATENT DOCUMENTS

| 4,387,129 A | 6/1983 | Vincent |
| 4,762,764 A | 8/1988 | Ng et al. |

(Continued)

FOREIGN PATENT DOCUMENTS

| CN | 1555318 | 12/2004 |
| CN | 103476882 | 12/2013 |

(Continued)

OTHER PUBLICATIONS

International Search Report and Written Opinion for International Application No. PCT/EP2015/074593 dated Mar. 16, 2016, 11 pages.

*Primary Examiner* — Barbara J Musser
(74) *Attorney, Agent, or Firm* — Dierker & Kavanaugh PC (57) ABSTRACT

There is provided a process for preparing a laminate, comprising electrostatically printing a transparent electrostatic ink composition onto a base material, wherein the transparent electrostatic ink composition comprises a thermoplastic resin, and a charge adjuvant and/or a charge director; providing a substrate; and contacting the substrate with the transparent electrostatic ink composition while the thermoplastic resin is softened or molten, and then allowing the thermoplastic resin to harden, so that the electrostatic ink composition adheres the base material and the substrate together. Laminate materials are also disclosed.

8 Claims, 2 Drawing Sheets

(51) Int. Cl.
| | | |
|---|---|---|
| *B32B 27/32* | (2006.01) | |
| *B32B 27/36* | (2006.01) | |
| *B32B 27/28* | (2006.01) | |
| *B32B 15/04* | (2006.01) | |
| *B32B 23/00* | (2006.01) | |
| *B32B 25/14* | (2006.01) | |
| *B32B 27/30* | (2006.01) | |
| *B32B 27/18* | (2006.01) | |
| *B32B 27/06* | (2006.01) | |
| *B32B 23/04* | (2006.01) | |
| *B32B 25/04* | (2006.01) | |
| *B32B 25/00* | (2006.01) | |
| *B32B 15/08* | (2006.01) | |
| *B32B 27/40* | (2006.01) | |
| *B32B 23/08* | (2006.01) | |
| *B32B 15/00* | (2006.01) | |
| *B32B 27/00* | (2006.01) | |
| *B32B 25/16* | (2006.01) | |
| *B32B 37/00* | (2006.01) | |
| *B32B 37/06* | (2006.01) | |
| *B32B 37/10* | (2006.01) | |
| *B32B 37/18* | (2006.01) | |
| *B32B 38/00* | (2006.01) | |

(52) U.S. Cl.
CPC ............. *B32B 23/00* (2013.01); *B32B 23/04* (2013.01); *B32B 23/08* (2013.01); *B32B 25/00* (2013.01); *B32B 25/04* (2013.01); *B32B 25/14* (2013.01); *B32B 25/16* (2013.01); *B32B 27/00* (2013.01); *B32B 27/06* (2013.01); *B32B 27/08* (2013.01); *B32B 27/18* (2013.01); *B32B 27/28* (2013.01); *B32B 27/281* (2013.01); *B32B 27/30* (2013.01); *B32B 27/302* (2013.01); *B32B 27/304* (2013.01); *B32B 27/306* (2013.01); *B32B 27/308* (2013.01); *B32B 27/32* (2013.01); *B32B 27/36* (2013.01); *B32B 27/40* (2013.01); *B32B 37/0076* (2013.01); *B32B 37/06* (2013.01); *B32B 37/10* (2013.01); *B32B 37/182* (2013.01); *B32B 38/145* (2013.01); *B32B 2250/00* (2013.01); *B32B 2250/02* (2013.01); *B32B 2250/24* (2013.01); *B32B 2255/10* (2013.01); *B32B 2255/205* (2013.01); *B32B 2255/26* (2013.01); *B32B 2255/28* (2013.01); *B32B 2274/00* (2013.01); *B32B 2307/20* (2013.01); *B32B 2307/40* (2013.01); *B32B 2307/412* (2013.01); *B32B 2307/518* (2013.01); *B32B 2307/75* (2013.01); *B32B 2310/14* (2013.01); *B32B 2323/04* (2013.01); *B32B 2323/10* (2013.01); *B32B 2367/00* (2013.01); *B32B 2439/00* (2013.01); *B32B 2439/70* (2013.01); *B32B 2439/80* (2013.01); *B32B 2457/00* (2013.01); *B32B 2553/00* (2013.01)

(56) References Cited

U.S. PATENT DOCUMENTS

| | | |
|---|---|---|
| 4,968,063 A | 11/1990 | McConville et al. |
| 5,546,114 A | 8/1996 | Tait et al. |
| 6,221,545 B1 | 4/2001 | Tran et al. |
| 6,468,637 B1 | 10/2002 | Kwasny et al. |
| 6,509,128 B1 * | 1/2003 | Everaerts .................. C09J 5/00 430/111.4 |
| 7,854,987 B2 | 12/2010 | Jaipuria |
| 2002/0047889 A1 | 4/2002 | Springett et al. |
| 2003/0118801 A1 | 6/2003 | Miller |
| 2003/0230209 A1 | 12/2003 | Gonzalez et al. |
| 2005/0054780 A1 | 3/2005 | Zhou et al. |
| 2007/0253751 A1 * | 11/2007 | Thaler .................. G03G 9/0926 399/296 |
| 2008/0241723 A1 | 10/2008 | Kmiecik-Lawrynowicz |
| 2008/0248261 A1 | 10/2008 | Bonnett et al. |
| 2011/0123228 A1 * | 5/2011 | Roditi .................. C09D 11/037 399/237 |
| 2013/0004742 A1 | 1/2013 | La Costa |
| 2013/0202860 A1 | 8/2013 | Wei et al. |
| 2014/0093706 A1 | 4/2014 | Tzomik et al. |
| 2014/0370252 A1 * | 12/2014 | Regnier .................. B32B 27/36 428/201 |
| 2015/0220010 A1 | 8/2015 | Grinwald et al. |
| 2015/0227064 A1 * | 8/2015 | Bandriss .................. G03G 7/002 156/277 |
| 2017/0329270 A1 * | 11/2017 | Ron ...................... G03G 15/10 |
| 2018/0229475 A1 | 8/2018 | Tzomik |

FOREIGN PATENT DOCUMENTS

| | | |
|---|---|---|
| CN | 104853915 | 8/2015 |
| CN | 107209464 | 9/2017 |
| GB | 1291841 | 10/1972 |
| JP | 02155692 | 6/1990 |
| JP | H11034215 | 9/1999 |
| JP | 200553109 | 3/2005 |
| JP | 2008175888 | 7/2008 |
| JP | 2014133954 | 7/2014 |
| JP | 2014153646 | 8/2014 |
| JP | 2015529835 | 10/2015 |
| WO | WO 01/79318 | 10/2001 |
| WO | WO 2014/067578 | 5/2014 |
| WO | WO 2014/206494 | 12/2014 |
| WO | WO2014206492 | 12/2014 |
| WO | WO 2015/110173 | 7/2015 |

* cited by examiner

LAMINATES

BACKGROUND

Laminates are layered materials. They may be used in a large variety of applications, including, but not limited to, the packaging and labelling fields. In some instances, laminates are formed from polymeric films which are adhered together. Other laminates include a variety of materials, which may or may not include plastic. Laminates sometimes display decorative images or information.

DETAILED DESCRIPTION

Before the laminates and related aspects are disclosed and described, it is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is noted that, as used in this specification and the appended claims, the singular forms "a," "an," and "the" include plural referents unless the context clearly dictates otherwise.

As used herein, "liquid carrier", "carrier liquid," "carrier," or "carrier vehicle" refers to the fluid in which the polymers, particles, colorant, charge directors and other additives can be dispersed to form a liquid electrostatic ink or electrophotographic ink. Such carrier liquids and vehicle components are known in the art. Typical carrier liquids can include a mixture of a variety of different agents, such as surfactants, co-solvents, viscosity modifiers, and/or other possible ingredients.

As used herein, "electrostatic ink composition" generally refers to an ink composition that is typically suitable for use in an electrostatic printing process, sometimes termed an electrophotographic printing process. The electrostatic ink composition, when printing, may include chargeable particles of the resin and, if present, the pigment dispersed in a liquid carrier, which may be as described herein. A transparent electrostatic ink composition may be an electrostatic ink composition that lacks a colorant. An electrostatic ink composition for forming an image layer as described herein, in contrast, may contain a colorant (e.g. a pigment). A colorant may be a species that imparts a color to the ink, e.g. a color selected from a magenta, cyan, yellow and black.

As used herein, "copolymer" refers to a polymer that is polymerized from at least two monomers.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic printing" or "electrophotographic printing" generally refers to the process that provides an image that is transferred from a photo imaging substrate either directly, or indirectly via an intermediate transfer member, to a print substrate. As such, the image is not substantially absorbed into the photo imaging substrate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid ink is employed in the electrophotographic process rather than a powder toner. An electrostatic printing process may involve subjecting the electrostatic ink composition to an electric field, e.g. an electric field having a field gradient of 1000 V/cm or more, or in some examples 1500 V/cm or more.

As used herein, in the context of the base material and substrate, the term "transparent" may mean having the property of transmitting rays of light through its substance so that an image printed beyond or behind can be seen distinctly through the substance. In the context of the electrostatic ink composition, the term "transparent" may mean having no or substantially no colorant or pigment.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

Unless otherwise stated, any feature described herein can be combined with any aspect or any other feature described herein.

In an aspect, there is provided a process for preparing a laminate. The process may comprise:

electrostatically printing a transparent electrostatic ink composition onto a base material, wherein the transparent electrostatic ink composition comprises a thermoplastic resin, and a charge adjuvant and/or a charge director;

providing a substrate; and contacting the substrate with the transparent electrostatic ink composition while the thermoplastic resin is softened or molten, and then allowing the thermoplastic resin to harden, so that the electrostatic ink composition adheres the base material and the substrate together.

In an aspect, there is provided a laminate material. The laminate may comprise:

a base material comprising a first polymeric film;

a transparent electrostatic ink composition printed on the base material, the printed transparent electrostatic ink composition comprising a thermoplastic resin, and a charge adjuvant and/or a charge director;

a substrate comprising a second polymeric film adhered to the base material by the transparent electrostatic ink composition.

In an aspect, there is provided a laminate producible according to the process described herein.

Laminate/Laminate Material

In some examples, the laminate or laminate material is a flexible packaging material. In some examples, the laminate or laminate material comprises a laminate structure with sufficient bond strength to avoid delamination of the layers. In some examples, the lamination bond strength is measured directly after the laminate or laminate material has cooled to room temperature following lamination. In some examples, the lamination bond strength is measured on a laminate or laminate material that has not been subjected to any curing or rest period following lamination and cooling. In some examples, the lamination bond strength is measured immediately after lamination and cooling of the laminate or laminate material.

In some examples, the laminate or laminate material has a lamination bond strength as measured by ASTM F0904-98R08. In some examples, the laminate or laminate material has a lamination bond strength of at least about 0.5 N/inch, for example at least about 1.0 N/inch, for example at least about 1.2 N/inch, for example at least about 1.5 N/inch, for example at least about 2.0 N/inch, for example at least about 2.5 N/inch, for example at least about 3.0 N/inch, for example at least about 4.0 N/inch, for example at least about 5.0 N/inch, for example at least about 6.0 N/inch, for example at least about 7.0 N/inch, for example at least about 8.0 N/inch, for example at least about 9.0 N/inch, for example about 10.0 N/inch, as measured by ASTM F0904-98R08.

In some examples, the laminate or laminate material has a lamination bond strength of less than about 10 N/inch, for example less than about 9.0 N/inch, for example less than about 8 N/inch, for example less than about 7.0 N/inch, for example less than about 6.0 N/inch, for example less than about 5.0 N/inch, for example less than about 4.0 N/inch, for example less than about 3.0 N/inch, for example less than about 2.5 N/inch, for example less than about 2.0 N/inch, for example less than about 1.5 N/inch, for example less than about 1.2 N/inch, for example less than about 1.0 N/inch, for example about 0.5 N/inch, as measured by ASTM F0904-98R08.

Transparent Electrostatic Ink Composition

The transparent electrostatic ink composition comprises a thermoplastic resin, and a charge adjuvant and/or a charge director. The transparent electrostatic ink composition does not contain any pigment, or comprises substantially lacks pigment and thus is a pigment-free composition. The transparent electrostatic ink composition may otherwise be termed a colourless electrostatic ink composition or a colorless varnish for digital printing. The transparent electrostatic ink may comprise less than 5 wt % solids of colorant, in some examples less than 3 wt % solids of colorant, in some examples less than 1 wt % solids of colorant. "Colorant" may be a material that imparts a color to the ink composition. As used herein, "colorant" includes pigments and dyes, such as those that impart colors such as black, magenta, cyan and yellow to an ink. As used herein, "pigment" generally includes pigment colorants, magnetic particles, aluminas, silicas, and/or other ceramics or organometallics. Thus, though the present description primarily exemplifies the use of pigment colorants, the term "pigment" can be used more generally to describe not only pigment colorants, but other pigments such as organometallics, ferrites, ceramics, etc.

The thermoplastic resin may constitute at least 85 wt % solids of the solids of the transparent electrostatic ink composition, in some examples at least 90 wt % solids of the solids of the transparent electrostatic ink composition, in some examples 95, wt % of the solids of the transparent electrostatic ink composition.

If a solid polar compound and/or additional polymer is present, the thermoplastic resin and the solid polar compound/additional polymer together may constitute at least 85 wt % solids of the solids of the transparent electrostatic ink composition, in some examples at least 90 wt % solids of the solids of the transparent electrostatic ink composition, in some examples 95, wt % of the solids of the transparent electrostatic ink composition. The remaining wt % may be a charge adjuvant and/or charge director as described herein.

The transparent electrostatic ink composition may further comprise at least one additive such as and additive selected from surfactants, viscosity modifiers, emulsifiers and the like.

In some examples, once printed, the transparent electrostatic ink composition forms a layer of less than 10 µm in thickness, for example less than 9 µm in thickness, less than 8 µm in thickness, less than 7 µm in thickness, less than 6 µm in thickness, less than 5 µm in thickness, less than 4 µm in thickness, less than 3 µm in thickness, less than 2 µm in thickness, less than 1.5 µm in thickness. In some examples, the transparent electrostatic ink composition is about 1 µm in thickness.

In some examples, once printed, the transparent electrostatic ink composition forms a layer greater than 0.1 µm in thickness, for example greater than 0.2 µm in thickness, greater than 0.3 µm in thickness, greater than 0.4 µm in thickness, greater than 0.5 µm in thickness, greater than 0.6 µm in thickness, greater than 0.7 µm in thickness, greater than 0.8 µm in thickness, greater than 0.9 µm in thickness. In some examples, the film of material is about 1 µm in thickness.

Liquid Carrier

In some examples, the transparent electrostatic ink composition, when printing, comprises a liquid carrier. Generally, the liquid carrier can act as a dispersing medium for the other components in the electrostatic ink composition. For example, the liquid carrier can comprise or be a hydrocarbon, silicone oil, vegetable oil, etc. The liquid carrier can include, but is not limited to, an insulating, non-polar, non-aqueous liquid that can be used as a medium for toner particles. The liquid carrier can include compounds that have a resistivity in excess of about $10^9$ ohm-cm. The liquid carrier may have a dielectric constant below about 5, in some examples below about 3. The liquid carrier can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the liquid carriers include, but are not limited to, aliphatic hydrocarbons, isoparaffinic compounds, paraffinic compounds, dearomatized hydrocarbon compounds, and the like. In particular, the liquid carriers can include, but are not limited to, Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

Before electrostatic printing, the liquid carrier can constitute about 20% to 99.5% by weight of the transparent electrostatic ink composition, in some examples 50% to 99.5% by weight of the transparent electrostatic ink composition. Before printing, the liquid carrier may constitute about 40 to 90% by weight of the transparent electrostatic ink composition. Before printing, the liquid carrier may constitute about 60% to 80% by weight of the transparent electrostatic ink composition. Before printing, the liquid carrier may constitute about 90% to 99.5% by weight of the transparent electrostatic ink composition, in some examples 95% to 99% by weight of the transparent electrostatic ink composition.

The ink, when electrostatically printed on the base material, may be substantially free from liquid carrier. In an electrostatic printing process and/or afterwards, the liquid carrier may be removed, e.g. by an electrophoresis processes during printing and/or evaporation, such that substantially just solids are transferred to the print substrate. Substantially free from liquid carrier may indicate that the ink printed on the base material contains less than 5 wt % liquid carrier, in some examples, less than 2 wt % liquid carrier, in some examples less than 1 wt % liquid carrier, in some examples less than 0.5 wt % liquid carrier. In some examples, the ink printed on the base material is free from liquid carrier.

Thermoplastic Resin

The transparent electrostatic ink composition includes a thermoplastic resin, referred to as the resin. A thermoplastic polymer is sometimes referred to as a thermoplastic resin.

The resin typically includes a polymer. The resin can include, but is not limited to, a thermoplastic polymer. In some examples, the polymer of the resin may be selected from ethylene acrylic acid copolymers; ethylene methacrylic acid copolymers; ethylene vinyl acetate copolymers; copolymers of ethylene (e.g. 80 wt % to 99.9 wt %), and alkyl (e.g. C1 to C5) ester of methacrylic or acrylic acid (e.g. 0.1 wt % to 20 wt %); copolymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); polyethylene; polystyrene; isotactic polypropylene (crystalline); ethylene ethyl acrylate; polyesters; polyvinyl toluene; polyamides; styrene/butadiene copolymers; epoxy resins; acrylic resins (e.g. copolymer of acrylic or methacrylic acid and at least one alkyl ester of acrylic or methacrylic acid wherein alkyl is, in some examples, from 1 to about 20 carbon atoms, such as methyl methacrylate (e.g. 50 wt % to 90 wt %)/methacrylic acid (e.g. 0 wt % to 20 wt %)/ethylhexylacrylate (e.g. 10 wt % to 50 wt %)); ethylene-acrylate terpolymers: ethylene-acrylic esters-maleic anhydride (MAH) or glycidyl methacrylate (GMA) terpolymers; ethylene-acrylic acid ionomers and combinations thereof.

The resin may comprise a polymer having acidic side groups. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures known in the art, for example using the procedure described in ASTM D1386.

The resin may comprise a polymer, in some examples a polymer having acidic side groups, that has a melt flow rate of less than about 60 g/10 minutes, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of in some examples about 50 g/10 minutes to about 120 g/10 minutes, in some examples 60 g/10 minutes to about 100 g/10 minutes. The melt flow rate can be measured using standard procedures known in the art, for example as described in ASTM D1238.

The acidic side groups may be in free acid form or may be in the form of an anion and associated with at least one counterion, typically metal counterions, e.g. a metal selected from the alkali metals, such as lithium, sodium and potassium, alkali earth metals, such as magnesium or calcium, and transition metals, such as zinc. The polymer having acidic sides groups can be selected from resins such as copolymers of ethylene and an ethylenically unsaturated acid of either acrylic acid or methacrylic acid; and ionomers thereof, such as methacrylic acid and ethylene-acrylic or methacrylic acid copolymers which are at least partially neutralized with metal ions (e.g. Zn, Na, Li) such as SUR-LYN® ionomers. The polymer comprising acidic side groups can be a copolymer of ethylene and an ethylenically unsaturated acid of either acrylic or methacrylic acid, where the ethylenically unsaturated acid of either acrylic or methacrylic acid constitute from 5 wt % to about 25 wt % of the copolymer, in some examples from 10 wt % to about 20 wt % of the copolymer.

The resin may comprise two different polymers having acidic side groups. The two polymers having acidic side groups may have different acidities, which may fall within the ranges mentioned above. The resin may comprise a first polymer having acidic side groups that has an acidity of from 50 mg KOH/g to 110 mg KOH/g and a second polymer having acidic side groups that has an acidity of 110 mg KOH/g to 130 mg KOH/g.

The resin may comprise two different polymers having acidic side groups: a first polymer having acidic side groups that has a melt flow rate of about 10 g/10 minutes to about 50 g/10 minutes and an acidity of from 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The resin may comprise two different polymers having acidic side groups: a first polymer that is a copolymer of ethylene (e.g. 92 to 85 wt %, in some examples about 89 wt %) and acrylic or methacrylic acid (e.g. 8 to 15 wt %, in some examples about 11 wt %) having a melt flow rate of 80 to 110 g/10 minutes and a second polymer that is a co-polymer of ethylene (e.g. about 80 to 92 wt %, in some examples about 85 wt %) and acrylic acid (e.g. about 18 to 12 wt %, in some examples about 15 wt %), having a melt viscosity lower than that of the first polymer, the second polymer for example having a melt viscosity of 15000 poise or less, in some examples a melt viscosity of 10000 poise or less, in some examples 1000 poise or less, in some examples 100 poise or less, in some examples 50 poise or less, in some examples 10 poise or less. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

In any of the resins mentioned above, the ratio of the first polymer having acidic side groups to the second polymer having acidic side groups can be from about 10:1 to about 2:1. In another example, the ratio can be from about 6:1 to about 3:1, in some examples about 4:1.

The resin may comprise a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The resin may comprise a first polymer having a melt viscosity of 15000 poise or more, in some examples 20000 poise or more, in some examples 50000 poise or more, in some examples 70000 poise or more; and in some examples, the resin may comprise a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The resin may comprise a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel 960 (from DuPont), and example of the second polymer is Nucrel 699 (from DuPont), and an example of the third polymer is AC-5120 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

If the resin comprises a single type of resin polymer, the resin polymer (excluding any other components of the electrostatic ink composition) may have a melt viscosity of 6000 poise or more, in some examples a melt viscosity of 8000 poise or more, in some examples a melt viscosity of 10000 poise or more, in some examples a melt viscosity of 12000 poise or more. If the resin comprises a plurality of polymers all the polymers of the resin may together form a mixture (excluding any other components of the electrostatic ink composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

The resin may comprise two different polymers having acidic side groups that are selected from copolymers of ethylene and an ethylenically unsaturated acid of either methacrylic acid or acrylic acid; and ionomers thereof, such as methacrylic acid and ethylene-acrylic or methacrylic acid copolymers which are at least partially neutralized with metal ions (e.g. Zn, Na, Li) such as SURLYN® ionomers. The resin may comprise (i) a first polymer that is a copolymer of ethylene and an ethylenically unsaturated acid of either acrylic acid and methacrylic acid, wherein the ethylenically unsaturated acid of either acrylic or methacrylic acid constitutes from 8 wt % to about 16 wt % of the copolymer, in some examples 10 wt % to 16 wt % of the copolymer; and (ii) a second polymer that is a copolymer of ethylene and an ethylenically unsaturated acid of either acrylic acid and methacrylic acid, wherein the ethylenically unsaturated acid of either acrylic or methacrylic acid constitutes from 12 wt % to about 30 wt % of the copolymer, in some examples from 14 wt % to about 20 wt % of the copolymer, in some examples from 16 wt % to about 20 wt % of the copolymer in some examples from 17 wt % to 19 wt % of the copolymer.

In an example, the thermoplastic resin constitutes about 10 to 99%, in some examples about 15 to 95%, by weight of the solids of the transparent electrostatic ink composition. In another example, the resin constitutes about 20 to 95% by weight of the solids of the transparent electrostatic ink composition. In another example, the resin constitutes about 25 to 95% by weight of the solids of the transparent electrostatic ink composition. In another example, the resin constitutes about 35 to 95% by weight, in some examples from 75 to 95% by weight, of the solids of the transparent electrostatic ink composition. In another example, the resin constitutes about 35 to 95% by weight, in some examples from 75 to 99% by weight, of the solids of the transparent electrostatic ink composition.

The thermoplastic resin may comprise a polymer having acidic side groups, as described above (which may be free of ester side groups), and a polymer having ester side groups. The polymer having ester side groups is, in some examples, a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1 to 50% by weight of the co-polymer, in some examples 5 to 40% by weight, in some examples 5 to 20% by weight of the copolymer, in some examples 5 to 15% by weight of the copolymer. The second monomer may constitute 1 to 50% by weight of the co-polymer, in some examples 5 to 40% by weight of the co-polymer, in some examples 5 to 20% by weight of the co-polymer, in some examples 5 to 15% by weight of the copolymer. In an example, the first monomer constitutes 5 to 40% by weight of the co-polymer, the second monomer constitutes 5 to 40% by weight of the co-polymer, and with the third monomer constituting the remaining weight of the copolymer. In an example, the first monomer constitutes 5 to 15% by weight of the co-polymer, the second monomer constitutes 5 to 15% by weight of the co-polymer, with the third monomer constituting the remaining weight of the copolymer. In an example, the first monomer constitutes 8 to 12% by weight of the co-polymer, the second monomer constitutes 8 to 12% by weight of the co-polymer, with the third monomer constituting the remaining weight of the copolymer. In an example, the first monomer constitutes about 10% by weight of the co-polymer, the second monomer constitutes about 10% by weight of the co-polymer, and with the third monomer constituting the remaining weight of the copolymer. The polymer having ester side groups may be selected from the Bynel® class of monomer, including Bynel 2022 and Bynel 2002, which are available from DuPont®.

The polymer having ester side groups may constitute 1% or more by weight of the total amount of the resin polymers in the resin, e.g. the total amount of the polymer or polymers having acidic side groups and polymer having ester side groups. The polymer having ester side groups may constitute 5% or more by weight of the total amount of the resin polymers in the resin, in some examples 8% or more by weight of the total amount of the resin polymers in the resin, in some examples 10% or more by weight of the total amount of the resin polymers in the resin, in some examples 15% or more by weight of the total amount of the resin polymers in the resin, in some examples 20% or more by weight of the total amount of the resin polymers in the resin, in some examples 25% or more by weight of the total amount of the resin polymers in the resin, in some examples 30% or more by weight of the total amount of the resin polymers in the resin, in some examples 35% or more by weight of the total amount of the resin polymers in the resin. The polymer having ester side groups may constitute from 5% to 50% by weight of the total amount of the resin polymers in the resin, in some examples 10% to 40% by weight of the total amount of the resin polymers in the resin, in some examples 15% to 30% by weight of the total amount of the polymers in the resin.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

In an example, the polymer or polymers of the resin can be selected from the Nucrel family of toners (e.g. Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, and Bynell 2020 (sold by E. I. du PONT)), the Aclyn family of toners (e.g. Aaclyn 201, Aclyn 246, Aclyn 285, and Aclyn 295), and the Lotader family of toners (e.g. Lotader 2210, Lotader, 3430, and Lotader 8200 (sold by Arkema)).

Charge Director and Charge Adjuvant

The transparent electrostatic ink composition may include either a charge director or a charge adjuvant or both.

The charge director may be added in order to impart and/or maintain sufficient electrostatic charge on the ink particles, which may be particles comprising the thermoplastic resin. The charge director may comprise ionic compounds, particularly metal salts of fatty acids, metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. The charge director can be selected from, but is not limited to, oil-soluble petroleum sulfonates (e.g. neutral Calcium Petronate™, neutral Barium Petronate™, and basic Barium Petronate™), polybutylene succinimides (e.g. OLOA™ 1200 and Amoco 575), and glyceride salts (e.g. sodium salts of phosphated mono- and diglycerides with unsaturated and saturated acid substituents), sulfonic acid salts including, but not limited to, barium, sodium, calcium, and aluminum salts of sulfonic acid. The sulfonic acids may include, but are not limited to, alkyl sulfonic acids, aryl sulfonic acids, and sulfonic acids of alkyl succinates. The charge director can impart a negative charge or a positive charge on the resin-containing particles of an electrostatic ink composition.

In some examples, the transparent electrostatic ink composition comprises a charge director comprising a simple salt. Simple salts are salts that do not form micelles by themselves, although they may form a core for micelles with a micelle forming salt. The ions constructing the simple salts are all hydrophilic. The simple salt may include a cation selected from the group consisting of Mg, Ca, Ba, NH4, tert-butyl ammonium, Li+, and Al+3, or from any sub-group thereof. The simple salt may include an anion selected from the group consisting of $SO_4^{2-}$, $PO^{3-}$, $NO^{3-}$, $HPO_4^{2-}$, $CO_3^{2-}$, acetate, trifluoroacetate (TFA), $Cl^-$, $BF_4^-$, $F-$, $ClO_4-$, and $TiO_3^{4-}$, or from any sub-group thereof. The simple salt may be selected from $CaCO_3$, $Ba_2TiO_3$, $Al_2(SO_4)$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, Tert-butyl ammonium bromide, $NH_4NO_3$, LiTFA, $Al_2(SO_4)3$, $LiClO_4$ and $LiBF_4$, or any sub-group thereof.

The charge director may include at least one of (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and can be obtained, for example, from Chemtura. An example isopropyl amine sulphonate salt is dodecyl benzene sulfonic acid isopropyl amine, which is available from Croda.

In some examples, the transparent electrostatic ink composition comprises a charge director comprising a sulfosuccinate salt of the general formula MAn, wherein M is a metal, n is the valence of M, and A is an ion of the general formula (I):

[R¹—O—C(O)CH₂CH(SO₃)C(O)—O—R²]⁻  (I)

wherein each of $R^1$ and $R^2$ is an alkyl group.

The sulfosuccinate salt of the general formula MAn is an example of a micelle forming salt. The charge director may be substantially free or free of an acid of the general formula HA, where A is as described above. The charge director may include micelles of said sulfosuccinate salt enclosing at least some of the nanoparticles. The charge director may include at least some nanoparticles having a size of 200 nm or less, and/or in some examples 2 nm or more.

In the formula [R₁—O—C(O)CH₂CH(SO₃⁻)C(O)—O—R₂], in some examples each of $R_1$ and $R_2$ is an aliphatic alkyl group. In some examples, each of $R_1$ and $R_2$ independently is a C6-25 alkyl. In some examples, said aliphatic alkyl group is linear. In some examples, said aliphatic alkyl group is branched. In some examples, said aliphatic alkyl group includes a linear chain of more than 6 carbon atoms. In some examples, $R_1$ and $R_2$ are the same. In some examples, at least one of $R_1$ and $R_2$ is $C_{13}H_{27}$. In some examples, M is Na, K, Cs, Ca, or Ba.

In some examples, the charge director constitutes about 0.001% to 20%, in some examples 0.01% to 20% by weight, in some examples 0.01 to 10% by weight, in some examples 0.01% to 1% by weight of the solids of an transparent electrostatic ink composition. In some examples, the charge director constitutes about 0.001% to 0.15% by weight of the solids of the transparent electrostatic ink composition, in some examples 0.001% to 0.15%, in some examples 0.001% to 0.02% by weight of the solids of an transparent electrostatic ink composition, in some examples 0.1% to 2% by weight of the solids of the transparent electrostatic ink composition, in some examples 0.2% to 1.5% by weight of the solids of the transparent electrostatic ink composition in some examples 0.1% to 1% by weight of the solids of the transparent electrostatic ink composition, in some examples 0.2% to 0.8% by weight of the solids of the transparent electrostatic ink composition. In some examples, the charge director is present in an amount of at least 1 mg of charge director per gram of solids of the transparent electrostatic ink composition (which will be abbreviated to mg/g), in some examples at least 2 mg/g, in some examples at least 3 mg/g, in some examples at least 4 mg/g, in some examples at least 5 mg/g. In some examples, the charge director is present in the amounts stated above, and the charge director is present in an amount of from 1 mg to 50 mg of charge director per gram of solids of the transparent electrostatic ink composition (which will be abbreviated to mg/g), in some examples from 1 mg/g to 25 mg/g, in some examples from 1 mg/g to 20 mg/g, in some examples from 1 mg/g to 15 mg/g, in some examples from 1 mg/g to 10 mg/g, in some examples from 3 mg/g to 20 mg/g, in some examples from 3 mg/g to 15 mg/g, in some examples from 5 mg/g to 10 mg/g.

A charge adjuvant may promote charging of the particles when a charge director is present. The method as described here may involve adding a charge adjuvant at any stage. The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium and ammonium salts, copolymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate. In an example, the charge adjuvant is or includes aluminum di- or tristearate. The charge adjuvant may be present in an amount of about 0.1 to 5% by weight, in some examples about 0.1 to 1% by weight, in some examples about 0.3 to 0.8% by weight of the solids of the transparent electrostatic ink composition, in some examples about 1 wt % to 3 wt % of the solids of the transparent electrostatic ink composition, in some examples about 1.5 wt % to 2.5 wt % of the solids of the transparent electrostatic ink composition.

In some examples, the transparent electrostatic ink composition further includes, e.g. as a charge adjuvant, a salt of multivalent cation and a fatty acid anion. The salt of multivalent cation and a fatty acid anion can act as a charge adjuvant. The multivalent cation may, in some examples, be a divalent or a trivalent cation. In some examples, the multivalent cation is selected from Group 2, transition metals and Group 3 and Group 4 in the Periodic Table. In some examples, the multivalent cation includes a metal selected from Ca, Sc, Ti, V, Cr, Mn, Fe, Co, Ni, Cu, Zn, Al and Pb. In some examples, the multivalent cation is Al3+. The fatty acid anion may be selected from a saturated or unsaturated fatty acid anion. The fatty acid anion may be selected from a $C_8$ to $C_{28}$ fatty acid anion, in some examples a $C_{14}$ to $C_{22}$ fatty acid anion, in some examples a $C_{16}$ to $C_{20}$ fatty acid anion, in some examples a $C_{17}$, $C_{18}$ or $C_{19}$ fatty acid anion. In some examples, the fatty acid anion is selected from a caprylic acid anion, capric acid anion, lauric acid anion, myristic acid anion, palmitic acid anion, stearic acid anion, arachidic acid anion, behenic acid anion and cerotic acid anion.

The charge adjuvant, which may, for example, be or include a salt of multivalent cation and a fatty acid anion, may be present in an amount of 0.1 wt % to 5 wt % of the solids of the transparent electrostatic ink composition, in some examples in an amount of 0.1 wt % to 2 wt % of the solids of the transparent electrostatic ink composition, in some examples in an amount of 0.1 wt % to 2 wt % of the solids of the transparent electrostatic ink composition, in some examples in an amount of 0.3 wt % to 1.5 wt % of the solids of the transparent electrostatic ink composition, in some examples about 0.5 wt % to 1.2 wt % of the solids of the transparent electrostatic ink composition, in some examples about 0.8 wt % to 1 wt % of the solids of the transparent electrostatic ink composition, in some examples about 1 wt % to 3 wt % of the solids of the transparent electrostatic ink composition, in some examples about 1.5 wt % to 2.5 wt % of the solids of the transparent electrostatic ink composition.

Other Additives

The transparent electrostatic ink composition may include an additive or a plurality of additives. The additive or plurality of additives may be added at any stage of the method. The additive or plurality of additives may be selected from a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refer to a wax that is incompatible with the resin. Specifically, the wax phase separates from the resin phase upon the cooling of the resin fused mixture on a print substrate during and after the transfer of the ink film to the print substrate, e.g. from an intermediate transfer member, which may be a heated blanket.

Additional Polymers

The electrostatic ink composition may contain additional polymers, some of them known as hot melt adhesives. The introduction of these polymers into the electrostatic ink composition enhances adhesion properties.

The adhesion-enhancing polymers or non-polymers may be first swollen in a carrier liquid, together with the resin. Other polymers which do not swell in the carrier liquid may be pre-ground into a fine powder prior to their introduction into the resin. Additional polymers introduced into the electrostatic ink composition may be for example selected from vinyl acetate copolymers (sometimes termed ethylene vinyl acetate co-polymers), polyolefins such as polyethylene (which may be selected from low density polyethylene and high density polyethylene), polybutene-1, styrene block co-polymers (including styrene-butadiene-styrene, styrene-isoprene-styrene, styrene-ethylene and/or butylenes-styrene, styrene-ethylene and/or propylene, polycaprolactone, polycarbonates, fluoropolymers, silicone rubbers, polypyrrole, co-polymers of ethylene acrylic/methacrylic ethylene maleic anhydride copolymers or ter-polymers of ethylene maleic anhydride acrylic, ethylene acrylates/methacrylates co polymers and ter-polymers, blocked co-polymers, like polyethylene co-ethylene glycol copolymer, or blocked tri-polymers, ionomers, polyamides and copolymers thereof, amine-containing polymers, polyesters and derivatives thereof, polyurethanes, epoxy and mixtures thereof.

In some examples, the electrostatic ink composition may comprise a resin selected from ethylene acrylic acid copolymers and ethylene methacrylic acid copolymers and an additional polymer selected from vinyl acetate co-polymers (sometimes termed ethylene vinyl acetate co-polymers), polyolefins such as polyethylene (which may be selected from low density polyethylene and high density polyethylene), polybutene-1, styrene block co-polymers (including styrene-butadiene-styrene, styrene-isoprene-styrene, styrene-ethylene and/or butylene-styrene, styrene-ethylene and/or propylene, polycaprolactone, polycarbonates, fluoropolymers, silicone rubbers, polypyrrole, ethylene maleic anhydride co-polymers, ter-polymers of ethylene maleic anhydride acrylic acid, ethylene acrylates/methacrylates co-polymers and ter-polymers, blocked co-polymers, such as polyethylene co-ethylene glycol copolymer, or blocked tri-polymers, ionomers, polyamides and copolymers thereof, amine-containing polymers, polyesters and derivatives thereof, polyurethanes, epoxy and mixtures thereof.

Solid Polar Compound

The transparent electrostatic ink composition may further comprise a solid polar compound. In some examples, the solid polar compound is a solid (e.g., at room temperature, i.e., from about 20° C. to about 25° C.), colorless organic material. The solid organic material may be a polymeric material or a non-polymeric material. The solid polar compound may be an organic particle that is resistant to swelling or dissolving in a non-polar carrier fluid, e.g. an isoparaffinic fluid as described herein. The solid polar compound may be dispersed in the resin, and, in some examples, is present in an amount up to 60 wt. % of solids in the transparent electrostatic ink composition. The solid polar compound may be selected from the group consisting of a saccharide, polyacrylic acid, polyvinyl alcohol, an epoxy resin, a solid blocked isocyanate, cellulose and its derivatives, silica gel, styrene maleic anhydride, a bismaleimide oligomer, a cellulose derivative and an aliphatic urethane acrylate.

In some examples, the transparent electrostatic ink composition comprises a saccharide or a modified saccharide. In some examples, modified saccharides are acetylated saccharides. In some examples, the transparent electrostatic ink composition comprises a disaccharide or a modified disaccharide. In some examples, the transparent electrostatic ink composition comprises a saccharide or modified saccharide selected from maltose monohydrate, sucrose, sucrose octanoate, sucrose octaacetate, dextrin, xylitol and sucrose benzoate.

In some examples, the transparent electrostatic ink composition comprises a saccharide or a modified saccharide in an amount of greater than 15 wt % of the non-volatile solids in the electrostatic ink composition, for example, in an amount of greater than 20 wt % of the non-volatile solids in the transparent electrostatic ink composition, for example in an amount of greater than 25 wt % of the non-volatile solids in the transparent electrostatic ink composition, for example in an amount of greater than 30 wt % of the non-volatile solids in the transparent electrostatic ink composition. In some examples, the transparent electrostatic ink composition comprises a saccharide or a modified saccharide in an amount of less than 60 wt % of the non-volatile solids in the transparent electrostatic ink composition, for example less than 50 wt % of the non-volatile solids in the electrostatic ink composition, for example less than 45 wt % of the non-volatile solids in the transparent electrostatic ink composition, for example less than 40 wt % of the non-volatile solids in the transparent electrostatic ink composition.

In some examples, the saccharide is selected from the group consisting of maltose monohydrate, sucrose, sucrose octanoate, dextrin, xylitol, sucrose octaacetate, and sucrose benzoate. In some examples, the solid polar compound has a particle size from about 30 nm to about 300 nm.

Examples of commercially available styrene maleic anhydrides include copolymers from Sartomer Co. USA, LLC, such as SMA® 40001, SMA® 10001, and SMA® 1000P. Examples of cellulose derivatives include sodium carboxylmethyl cellulose and cellulose acetate propionate. A suitable example of a bismaleimide oligomer is bis-stearamide, and a suitable example of an aliphatic urethane acrylate is REAFREE® UV ND-2335 from Arkema, Spain. It is to be understood that these solid polar compounds are examples, and that any other organic material that includes polar atoms and is resistant to swelling or dissolving in a non-polar carrier fluid may be used.

Base Material and Substrate

The transparent electrostatic ink composition is printed on at least one of a base material and a substrate. In some examples, the base material comprises a first polymeric film and, in some examples, the substrate comprises a second polymeric film. In some examples, at least one of the base material and the substrate is transparent. In some examples, both the base material and the substrate are transparent. In some examples, at least one of the base material and the substrate comprises a film of biaxially oriented polypropylene or poly(ethylene) terephthalate. In some examples, one of the base material and the substrate comprises a film of biaxially oriented polypropylene or poly(ethylene) terephthalate and the other of the base material and substrate comprises polyethylene.

The base material may comprise any suitable medium. The base material may include at least one layer. In some examples, the base material comprises a plurality of layers. The base be any suitable medium capable of having an electrostatic ink composition printed thereon. In some examples the base material comprises a layer, which will be termed a precursor base material, onto which at least one further layer is disposed to form the base material. The at least one further later may be an image layer as described herein, which may, for example be printed in an electrostatic printing process. In some examples, a primer layer is disposed on the precursor base material, and an image layer disposed on the primer layer to form the base material. The base material or precursor base material may include a material selected from an organic or inorganic material. The base material or precursor base material may include a natural polymeric material, e.g. cellulose. The base material or precursor base material may include a synthetic polymeric material, e.g. a polymer formed from alkylene monomers, including, but not limited to, polyethylene and polypropylene, and co-polymers such as styrene-polybutadiene. The polypropylene may, in some examples, be biaxially orientated polypropylene. The base material or precursor base material may include a metal, which may be in sheet form. The metal may be selected from or made from, for instance, aluminium (Al), silver (Ag), tin (Sn), copper (Cu), mixtures thereof. In an example, the print medium includes a cellulosic paper. In an example, the cellulosic paper is coated with a polymeric material, e.g. a polymer formed from styrene-butadiene resin. In some examples, the cellulosic paper has an inorganic material bound to its surface (before printing with ink) with a polymeric material, wherein the inorganic material may be selected from, for example, kaolinite or calcium carbonate. The base material is, in some examples, a cellulosic print medium such as paper. The cellulosic print medium is, in some examples, a coated cellulosic print. In some examples, a primer may be coated onto the print medium, before the transparent electrostatic ink composition is printed onto the base material.

In some examples, the base material may be the innermost layer of a flexible packaging material in use, and may thus be in contact with packaged goods. In some examples the base material is referred to as a functional substrate and is functional in the sense that it provides a barrier function to protect the packaged goods. The base material or functional substrate may serve as a barrier to any external influence that could damage or otherwise reduce the quality of the packaged goods, in particular food, by preventing ingress of, for example, moisture, oxygen, other oxidants and pathogens such as viruses and bacteria.

In some examples, the base material forms the outermost layer of a flexible packaging material in use. In some examples, the base material is transparent in order that any printed image or information is visible to the consumer.

In some examples, the base material comprises a thin film or sheet of at least one of paper, metallic foil, and plastic. In some examples, the base material is transparent. In some examples, the base material comprises a metallized paper or a metallized plastic film. In some examples, the base material comprises an aluminium foil. In some examples the base material comprises a thin film of a plastic material, for example, polyethylene (PE), linear low density polyethylene (LLDPE), low density polyethylene (LDPE), polypropylene (PP), biaxially oriented polypropylene (BOPP). In some examples, the base material comprises a metallized paper in the form of a paper substrate coated on one surface with a layer of metal, for example aluminium. In some examples, the base material comprises a metallized plastic film in the form of a polymer substrate coated on one surface with a layer of metal, for example aluminium. In some examples, the base material comprises a metallized plastic film in the form of a metallized BOPP film, a metallized PET film, or a metallized polyethylene (PE) film.

In some examples, the base material comprises a thin film of material, wherein the film is less than 100 µm in thickness, for example less than 90 µm in thickness, less than 80 µm in thickness, less than 70 µm in thickness, less than 60 µm in thickness, less than 50 µm in thickness, less than 40 µm in thickness, less than 30 µm in thickness, less than 20

μm in thickness, less than 15 μm in thickness. In some examples, the film of material is about 12 μm in thickness.

In some examples, the base material comprises a thin film of material, wherein the film is greater than 12 μm in thickness, for example greater than 15 μm in thickness, greater than 20 μm in thickness, greater than 30 μm in thickness, greater than 40 μm in thickness, greater than 50 μm in thickness, greater than 60 μm in thickness, greater than 70 μm in thickness, greater than 80 μm in thickness, greater than 90 μm in thickness. In some examples, the film of material is about 100 μm in thickness.

The transparent electrostatic ink composition adheres the base material to a substrate. The substrate may be any suitable material. The substrate may include a material selected from an organic or inorganic material. The material may include a natural polymeric material, e.g. cellulose. The material may include a synthetic polymeric material, e.g. a polymer formed from alkylene monomers, including, but not limited to, polyethylene and polypropylene, and co-polymers such as styrene-polybutadiene. The polypropylene may, in some examples, be biaxially orientated polypropylene. The material may include a metal, which may be in sheet form. The metal may be selected from or made from, for instance, aluminium (Al), silver (Ag), tin (Sn), copper (Cu), mixtures thereof. In an example, the substrate includes a cellulosic paper. In an example, the cellulosic paper is coated with a polymeric material, e.g. a polymer formed from styrene-butadiene resin. In some examples, the cellulosic paper has an inorganic material bound to its surface (before printing with ink) with a polymeric material, wherein the inorganic material may be selected from, for example, kaolinite or calcium carbonate. The substrate is, in some examples, a cellulosic print medium such as paper. The cellulosic print medium is, in some examples, a coated cellulosic print. In some examples, a primer may be coated onto the print medium, before the transparent electrostatic ink composition is printed onto the substrate.

In some examples, the substrate may be the innermost layer of a flexible packaging material in use, and may thus be in contact with packaged goods. In some examples the substrate is referred to as a functional substrate and is functional in the sense that it provides a barrier function to protect the packaged goods. The substrate or functional substrate may serve as a barrier to any external influence that could damage or otherwise reduce the quality of the packaged goods, in particular food, by preventing ingress of, for example, moisture, oxygen, other oxidants and pathogens such as viruses and bacteria.

In some examples, the substrate forms the outermost layer of a flexible packaging material in use. In some examples, the substrate is transparent in order that any printed image or information is visible to the consumer.

In some examples, the substrate comprises a thin film or sheet of at least one of paper, metallic foil, and plastic, and, in some examples, the base material comprises a polymeric film as described herein. In some examples, the substrate comprises a metallized paper or a metallized plastic film. In some examples, the substrate comprises an aluminium foil. In some examples the substrate comprises a thin film of a plastic material, for example, polyethylene (PE), linear low density polyethylene (LLDPE), low density polyethylene (LDPE), polypropylene (PP), biaxially oriented polypropylene (BOPP). In some examples, the substrate comprises a metallized paper in the form of a paper substrate coated on one surface with a layer of metal, for example aluminium. In some examples, the substrate comprises a metallized plastic film in the form of a polymer substrate coated on one surface with a layer of metal, for example aluminium. In some examples, the substrate comprises a metallized plastic film in the form of a metallized BOPP film, a metallized PET film, or a metallized polyethylene (PE) film.

In some examples, the substrate comprises a thin film of material, wherein the film is less than 100 μm in thickness, for example less than 90 μm in thickness, less than 80 μm in thickness, less than 70 μm in thickness, less than 60 μm in thickness, less than 50 μm in thickness, less than 40 μm in thickness, less than 30 μm in thickness, less than 20 μm in thickness, less than 15 μm in thickness. In some examples, the film of material is about 12 μm in thickness.

In some examples, the substrate comprises a thin film of material, wherein the film is greater than 12 μm in thickness, for example greater than 15 μm in thickness, greater than 20 μm in thickness, greater than 30 μm in thickness, greater than 40 μm in thickness, greater than 50 μm in thickness, greater than 60 μm in thickness, greater than 70 μm in thickness, greater than 80 μm in thickness, greater than 90 μm in thickness. In some examples, the film of material is about 100 μm in thickness.

In some examples, the substrate comprises a film of a polymer, for example a thermoplastic polymer. In some examples, the substrate comprises a film of biaxially oriented polypropylene (BOPP), or polyethylene terephthalate (PET). Other suitable polymers will be known in the art and the examples provided above should be seen as non-limiting examples only.

In some examples the substrate and/or the base material comprises a clear plastic, which may comprise a polymer as described herein, e.g. a polymer selected from polyvinyl chloride (PVC), polyethylene terephthalate (PET), polystyrene (PS), a polycarbonate (PC), acrylonitrile butadiene styrene (ABS), polypropylene (PP) (e.g. BOPP) and acrylic (PMMA), which may be in the form of a sheet or film.

In some examples, the substrate comprises a thin film of a polymer, wherein the film is less than 100 μm in thickness, for example less than 90 μm in thickness, less than 80 μm in thickness, less than 70 μm in thickness, less than 60 μm in thickness, less than 50 μm in thickness, less than 40 μm in thickness, less than 30 μm in thickness, less than 20 μm in thickness, less than 15 μm in thickness. In some examples, the film of polymer is about 12 μm in thickness.

In some examples, the substrate comprises a thin film of a polymer, wherein the film is greater than 12 μm in thickness, for example greater than 15 μm in thickness, greater than 20 μm in thickness, greater than 30 μm in thickness, greater than 40 μm in thickness, greater than 50 μm in thickness, greater than 60 μm in thickness, greater than 70 μm in thickness, greater than 80 μm in thickness, greater than 90 μm in thickness. In some examples, the film of polymer is about 100 μm in thickness.

Image Layer

In some examples, at least one of the base material and the substrate has an image layer, and the transparent electrostatic ink composition is printed on the image layer. The image layer may comprise a colorant selected from a black colorant, a magenta colorant, a yellow colorant and cyan colorant.

In some examples, at least one of the base material and the substrate comprises an image or information printed on a first surface of the base material or substrate. In some examples, at least one of the base material and the substrate comprises an image or information electrostatically printed on a first surface of the base material or substrate in an electrostatic printing process.

In some examples, before electrostatically printing the transparent electrostatic ink composition, at least one of the base material and the substrate is electrostatically printed with an electrostatic ink composition comprising a colorant, a thermoplastic resin, and a charge adjuvant and/or a charge director to form an image layer. The thermoplastic resin, the charge adjuvant and/or the charge director of the electrostatic ink composition used to form the image layer may, each, independently, be the same as or different from the thermoplastic resin, the charge adjuvant and/or the charge director of the transparent electrostatic ink composition, and may be selected from the thermoplastic resin, the charge adjuvant and/or the charge director disclosed above in respect of the transparent electrostatic ink composition. The colorant of the electrostatic ink composition may be selected from a black colorant, a magenta colorant, a cyan colorant and a yellow colorant.

In some examples, at least one of the base material and the substrate comprises an image layer. In some examples, at least one of the base material and the substrate comprises an image layer and/or information printed on a first surface of the base material or substrate in an electrostatic printing process using an electrostatic ink composition comprising a colorant, a thermoplastic resin and a charge director and/or a charge adjuvant. The image or information may be reverse printed onto the first surface of the base material or substrate. A second surface of the base material or substrate forming the outermost surface of a flexible packaging material causes the image or information to appear the right way round when viewed. In this way, the image or information is embedded within the multi-layer structure of the laminate or laminate material and not on the outermost surface, and thus protected from damage.

In some examples, b the base material, which may comprise a plastic film, is subjected to a Corona treatment prior to printing the transparent electrostatic ink composition and/or the electrostatic ink composition comprising a colorant that forms an image layer, which may also improve bond strength. In some examples, at least one of the base material and substrate is subjected to a Corona treatment to improve bond strength.

Primer Layer

In some examples, at least one of the base material and the substrate comprises a primer layer, which may be disposed on a polymeric film, as described herein. In some examples, the transparent electrostatic ink composition or the electrostatic ink composition that forms the image layer is printed onto a primed base material, i.e. a base material having a primer layer. In some examples, the substrate is a primed substrate, i.e. a substrate having a primer layer. A primer layer may be a layer which comprises a print-receptive surface. In some examples the primer layer comprises an ethylene copolymer, for example Michelman DigiPrime® 050.

In some examples, at least one of the base material and the substrate has a primer on a surface onto which the transparent electrostatic ink composition or the electrostatic ink composition that forms the image layer is printed. In some examples, the base material comprises a precursor base material (e.g. a polymeric film layer) that has a first surface on which a primer is disposed, the image layer and/or the transparent electrostatic ink composition may then disposed on the primer disposed on the surface of the base material.

In some examples, the primer comprises a primer resin. In some examples, the primer resin may be selected from the group comprising or consisting of hydroxyl containing resins, carboxylic group containing resins, and amine based polymer formulations. In some examples a hydroxyl containing resin may be selected from polyvinyl alcohol resins, e.g. polyvinyl alcohol based as polyvinyl butyral formulation (Butvar, Eastman), Vinnol® (Wacker polymers), cellulose derivative additives (Eastman), polyester (Dynapol, Evonic) and polyurethane based formulation with hydroxyl groups. In some examples, the carboxylic group containing resins may be selected from: olefin co-acrylic or methacrylic acid based copolymers, polyacrylic acid based polymers, polylactic acid based polymers. In some examples, the amine based polymer formulations may be selected from polyamines, polyethylene imines. The primer resin may be selected from the group comprising, or consisting of, a polyvinyl alcohol resin, cellulose based resins, a polyester, a polyamine, a polyethylene imine resin, polyamide resin, polyurethane, copolymers of an alkylene monomer and an acrylic or methacrylic acid monomer, polyacrylic polymers. An example of a material suitable as a primer is DP030 (available from Michelman, Inc.).

In some examples, the primer resin comprises a carboxylic functional group, an amine functional group or a polyol functional group. In some examples, the primer resin comprises an amine functional group or a carboxylic functional group.

In some examples, the primer resin comprises an amine functional group. In some examples, the primer resin comprises or consists of a polyethylene imine resin. An example of a material suitable as a primer is DP050 (available from Michelman, Inc.).

In some examples, the primer comprises a cross-linked primer resin.

In some examples, the base material comprises a precursor base material (e.g. a polymeric film) having a first surface that has a primer thereon and the transparent electrostatic ink composition is printed onto the primer on the first surface of the first flexible substrate.

In some examples, the base material comprises a precursor base material (e.g. a polymeric film) having a first surface that has a primer on the first surface and an image layer, is printed, in some examples electrostatically printed, onto the primer on the first surface of the precursor base material to form the base material, and the transparent electrostatic ink composition is electrostatically printed on the image layer.

Multiple Layers

In some examples, two or more layers of the transparent electrostatic ink composition are printed onto the base material, resulting in higher bonding strength than with one printed layer. In some examples, two or more layers of the transparent electrostatic ink composition may be printed on top of an image layer on the base material.

Selective Printing and Blister Packs

In some examples, the transparent electrostatic ink composition is selectively printed onto predetermined portions of the base material and the substrate adhered to the base material at the predetermined portions of the base material. In some examples, the laminate comprises a base material comprising a first polymeric film; a transparent electrostatic ink composition printed on the base material, the printed transparent electrostatic ink composition comprising a thermoplastic resin, and a charge adjuvant and/or a charge director; and a substrate comprising a second polymeric film adhered to the base material at predetermined portions of the base material by an electrostatic ink composition, wherein, in some examples, at least one of the substrate and or base material has a raised portion for accepting or containing an object between the substrate and the base material.

Digital electrostatic printing allows the selective application of the adhesive layer. Digitally-printed books and booklets, for example, can be now be bound immediately after printing.

Selective application of thermally sensitive adhesive maybe also useful in "blister packaging". The primary component of a blister pack is a cavity or pocket made from a formable web, usually a thermoformed plastic. This usually has a backing of paperboard or a lidding seal of aluminum foil or plastic. The cavity or pocket are glued to the backing. In most cases the backing carries a printed text and in many cases an image as well. The adhesive may be printed on the backing selectively as part of the printing process to allow adhering of the top cavity or pocket, or selectively on a flat portion of the thermoformed web, or the portion of a web that will be flat after thermoforming to form the 'so-called' blister. The latter may exclude the liquid adhesive coating or a thermal sensitive co-extruded layer, which in some examples can be added to the formable web.

Electrostatic Printing

The method may involve electrostatically printing a transparent electrostatic ink composition onto a base material, wherein the transparent electrostatic ink composition comprises a thermoplastic resin, and a charge adjuvant and/or a charge director. The base material, transparent electrostatic ink composition, the thermoplastic resin, and the charge adjuvant and/or the charge director may be as described herein.

The electrostatic printing may comprises
forming a latent electrostatic image on a surface;
contacting the surface with the transparent electrostatic ink composition, such that at least some of the particles adhere to the surface to form a developed toner image on the surface, and transferring the toner image to a base material or substrate as described herein.

The surface on which the latent electrostatic image is formed may be on a rotating member, e.g. in the form of a cylinder. The surface on which the latent electrostatic image is formed may form part of a photo imaging plate (PIP). The contacting may involve passing the electrostatic composition between a stationary electrode and a rotating member, which may be a member having the surface having a latent electrostatic image thereon or a member in contact with the surface having a latent electrostatic image thereon. A voltage is applied between the stationary electrode and the rotating member, such that the particles adhere to the surface of the rotating member. This may involve subjecting the electrostatic ink composition to an electric field having a field gradient of 50-400V/μm, or more, in some examples 600-900V/μm, or more.

The intermediate transfer member may be a rotating flexible member, which is in some examples heated, e.g. to a temperature of from 80 to 160° C., in some examples from 90 to 130° C., in some examples from 100 to 110° C.

The method may involve printing the transparent electrostatic ink composition onto an image layer, as described herein. The image layer described herein may involve electrostatically printing the image, which may be printed on the same apparatus as the transparent electrostatic ink composition.

Adhering the Base Material and Substrate Together

The method may involve contacting the substrate with the transparent electrostatic ink composition on the base material to adhere the base material to the substrate.

The method may involve contacting the substrate with the transparent electrostatic ink composition on the base material while the thermoplastic resin is softened or molten, and then allowing the thermoplastic resin to harden, so that the electrostatic ink composition adheres the base material and the substrate together.

The contacting may be carried out at a suitable temperature to allow the thermoplastic resin to soften or become molten. The suitable temperature may be 30° C. or above, in some examples 40° C. or above, in some examples 50° C. or above, in some examples 60° C. or above, 70° C. or above, 80° C. or above, in some examples 100° C. or above. The suitable temperature may be from 30° C. to 100° C., in some examples, in some examples 30° C. to 80° C. in some examples 30° C. to 70° C., in some examples 40° C. to 80° C. The suitable temperature may be from 50° C. to 160° C., in some examples from 80 to 160° C., in some examples from 90 to 130° C., in some examples from 100 to 110° C. The suitable temperature may be from 50° C. to 250° C., in some examples from 60° C. to 220° C., in some examples from 90° C. to 210° C., in some examples from 90 to 130° C., in some examples from 100 to 110° C.

The temperature may be a temperature at or above the Vicat softening point of the resin, as measured using ASTM D1525. The temperature may be a temperature at or above the freezing point of the resin, as measured by Differential Scanning calorimetry under ASTM D3418. The temperature may be a temperature at or above the melting point of the resin, as measured by Differential Scanning calorimetry under ASTM D3418. Where a plurality of polymers are used in the resin, the softening point, freezing point or the melting point, may be measured on the blend of polymers.

The contacting may involve pressing the base material and the substrate between two members, at least one of which, in some examples both of which, is/are heated, e.g. to a temperature mentioned above. In some examples, the two members may be heated to the same temperature, e.g. to a temperature mentioned above. In some examples, the two members may be heated to different temperatures, e.g. one at a temperature of from 40° C. to 100° C., e.g. 40° C. to 70° C., and the other at a higher temperature, e.g. a temperature of 100° C. or more, e.g. a temperature of from 110° C. to 250° C., e.g. a temperature of from 110° C. to 150° C. In some examples, at least one of the members is heated to a temperature of 100° C. or above. The two members may be rollers, and may be part of a lamination apparatus. If the two members are rollers, the speed of passing the substrate and the base material (having the transparent electrostatic image and, in some examples, the image layer therebetween) through the rollers may be a suitable speed to allow the resin of the transparent electrostatic ink composition to soften or melt. The speed may be at least 0.1 m/min, in some examples at least 0.5 m/min, in some examples at least 1 m/min. The speed may be at least 10 m/min or less, in some examples 5 m/min or less, in some examples 4 m/min or less, in some examples 3 m/min or less. The speed may be of from 0.1 m/min to 10 m/min, in some examples from 0.5 m/min to 5 m/min, in some examples 0.5 m/min to 4 m/min, in some examples 1 m/min to 3 m/min. The speed may be determined depending on the temperature of the rollers, with a higher temperature leading to faster softening or melting of the resin, allowing for a higher speed, since the contact time can be less.

Pressure may be applied to the base material and the substrate during the contacting, e.g. at the temperatures mentioned above, to improve adhesion. The pressure may be a pressure of at least from 1 bar (100 kPa), in some examples at least 2 bar, in some examples from 1 bar to 20 bar, in some examples 2 bar to 10 bar, in some examples 2 bar to 5 bar, in some examples 5 bar to 10 bar.

EXAMPLES

The following illustrates examples of the methods and other aspects described herein. Thus, these Examples should not be considered as limitations of the present disclosure, but are merely in place to teach how to make examples of the present disclosure.

In the following examples, 'Isopar' is Isopar™ L Fluid, produced by ExxonMobil and having CAS Number 64742-48-9.

In the following examples, the resin used is Nucrel 699, available from DuPont, and A-C 5120, available from Honeywell, in a weight ratio of 4:1.

In the following examples, NCD indicates a natural charge director made of three components: KT (natural soya lecithin in phospholipids and fatty acids), BBP (basic barium petronate i.e. a barium sulfonate salt of a 21-26 hydrocarbon alkyl, supplied by Chemtura), and GT (dodecyl benzene sulfonic acid isopropyl amine, supplied by Croda). The composition being 6.6 wt % KT, 9.8 wt % BBP and 3.6 wt % GT, balance 80% Isopar.

In the following examples, SCD indicates a synthetic charge director, being a barium bis sulfosuccinate salt.

Reference Example 1 (Liquid Adhesive Layer Lamination)

Figure 1:
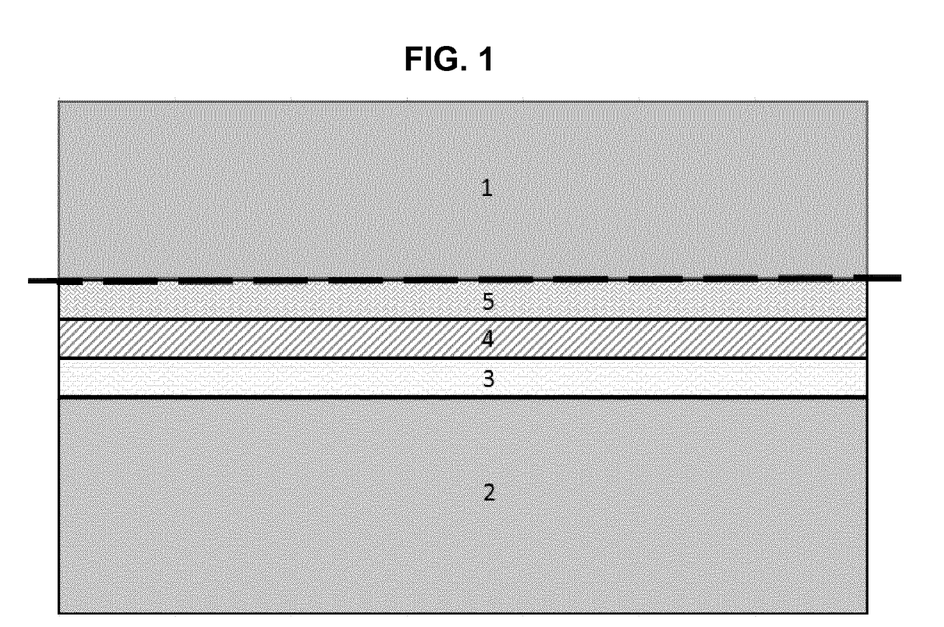
FIG. 1 shows the layers used in a reference laminate using an adhesive layer, formed from a liquid adhesive using a coating system. This is described in more detail in Reference Example 1 below.

An example of liquid adhesive lamination is now illustrated with reference to FIG. 1, which shows, schematically, a cross-section of the laminate produced in this Example. Lamination in this example follows printing and is carried out using an adhesive, but may, in some instances simply by the application of heat and pressure. In this example, the liquid adhesive (5) is applied onto the bottom polymeric film (2), which bears a printed image (4) upon a primer layer (3). After drying the adhesive, the top polymeric film (1) is laminated onto the bottom polymeric film by applying relatively mild temperature and pressure (for example 30-70° C., 3-4 bar). Curing time of the adhesive is in the order of days. More specific details are as follows.

An image (4) was printed on a primed polyethylene terephthalate (PET) polymeric film (2,3). The PET film (2) was primed prior to printing using a commercial primer (DP050 primer from Michelman). The image (4) was printed using an HP Indigo printing system equipped with in line priming (HP Indigo WS6600Digital Press (Geva), using commercial HP liquid electrostatic ink (LEP) ink.

Lamination of a polymeric film (1) onto the printed polymeric film followed the printing step. The printed PET was coated by liquid adhesive (5) (solvent based Morchem 246+90, which is polyester mixed with Desmodur 75 isocyanate, typical coat weight range is 3-5 gsm) using a coating system (for example LaboCombi 400 laminator (Nordmeccanica). The coated substrate was dried immediately after coating using hot air. The polymeric film (1), which may be, for example, bi-oriented polypropylene, polyethylene, polyethylene terephthalate (PET), was laminated using pressure 3-4 bar and temperature (30-70° C.). The pressure and temperature were applied in the nip between two rolls. The dashed line in FIG. 1 is the interface between the bottom and the top laminated films.

In the above laminating process, water based, solvent based or solvent-less adhesives are used. For example one component (IK) of Acrylic (Dow Robond 350+CR3 water based acrylic adhesive), polyether or polyester urethanes applied from a water emulsion or from a solvent solution. The latter adhesive polymers may be liquid at room temperature and are referred to as solvent less adhesives. Two component adhesive (2K) polyurethane adhesives where the first part may be a polyol and the second part may be isocyanate can be used.

The applied adhesive interacts in the curing process with the bottom printed ink layer on one side and the top polymeric film on the other side. This curing stage may last from several days. The lamination bond strength is tested by applying Test Method for Comparison of Bond Strength or Ply Adhesion of Similar Laminates Made from Flexible Materials (ASTM F0904-98R08).

Reference Example 2 (Thermal Lamination)

Figure 2:
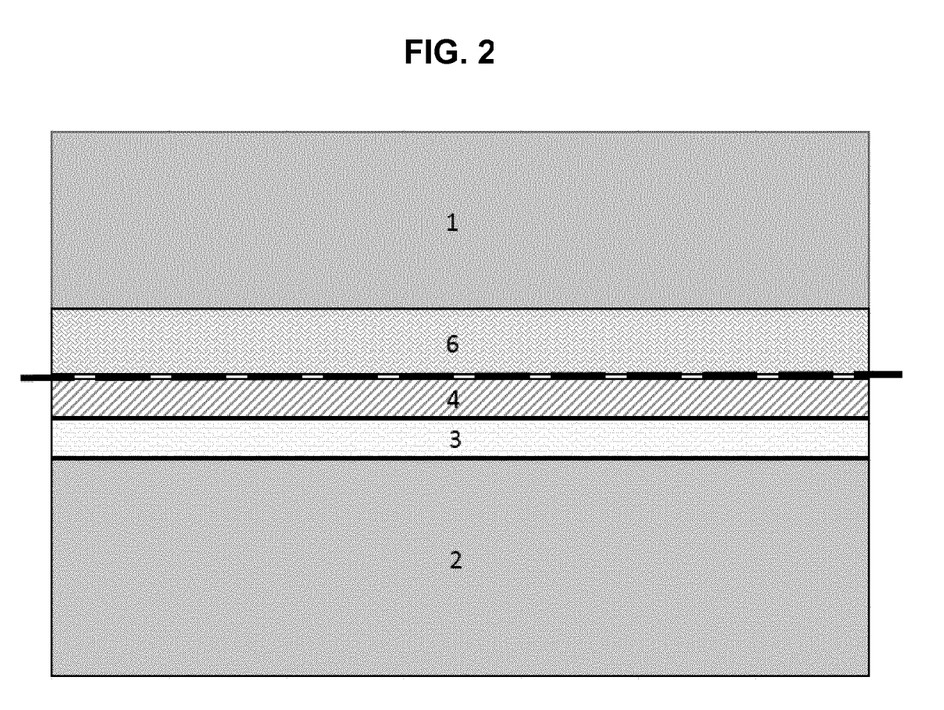
FIG. 2 shows the layers used in a further reference laminate, this reference laminate being formed by thermal lamination. This is described in more detail in Reference Example 2.

An example of thermal lamination is now illustrated with reference to FIG. 2, which shows, schematically, a cross-section of the laminate produced in this Example.

In this Reference Example, a polymeric film (1) bearing a heat sensitive layer (6) is brought into contact with a bottom polymeric film (2), bearing a printed image (4), upon a primer layer 3 (the image (4) contacting the heat sensitive layer (6)). Lamination is achieved by applying relatively high temperature (for example more than 100° C., 5-6 bar). The thermally active laminating layer (6) is activated by heat. The thermally sensitive layer (6) may be applied onto the top polymeric film 1 by co-extrusion of the thermally sensitive layer 6 with the polymeric top polymeric film 1 or by a coating process where the heat sensitive layer is applied on top of the polymeric film 1. More specific details are as follows.

In this example, an image (4) is printed on a primed polyethylene terephthalate (PET) polymeric film (2,3). The PET (2) was primed prior to printing using a commercial primer (3) (DP050 primer from Michelman). The image (4) was printed on a HP Indigo printing system equipped with in line priming (HP Indigo WS6600Digital Press (Geva) using commercial HP liquid electrostatic ink.

The top film (1) was coated with a thermally-activated laminating layer (6) comprising Tafmer MA9015 (Mitsoi) acid modified olefin used as thermal active adhesive. The thickness of thermal active layer ranges from 6 to 15 µm, usually 10 µm.

The heat activated layer (6) is co-extruded with the polymeric film (1) and is part of the production of the top polymeric film.

Another option for introducing the heat sensitive layer is by coating it onto the top layer laminate from a water or solvent based coating formulation. The top layer and the bottom layer are laminated by heat and pressure (5-6 bar, above 100° C.). The thermal laminating step may be carried out using pre-heating rolls, heating or nip rolls. The lamination is followed by a cooling step where the laminate is cooled by cooling rolls. The adhesion between the laminates originate from the inter penetration of the melted polymeric chains from one laminate to the other. Cooling results in adhesion between the laminates.

Example 3

Figure 3:
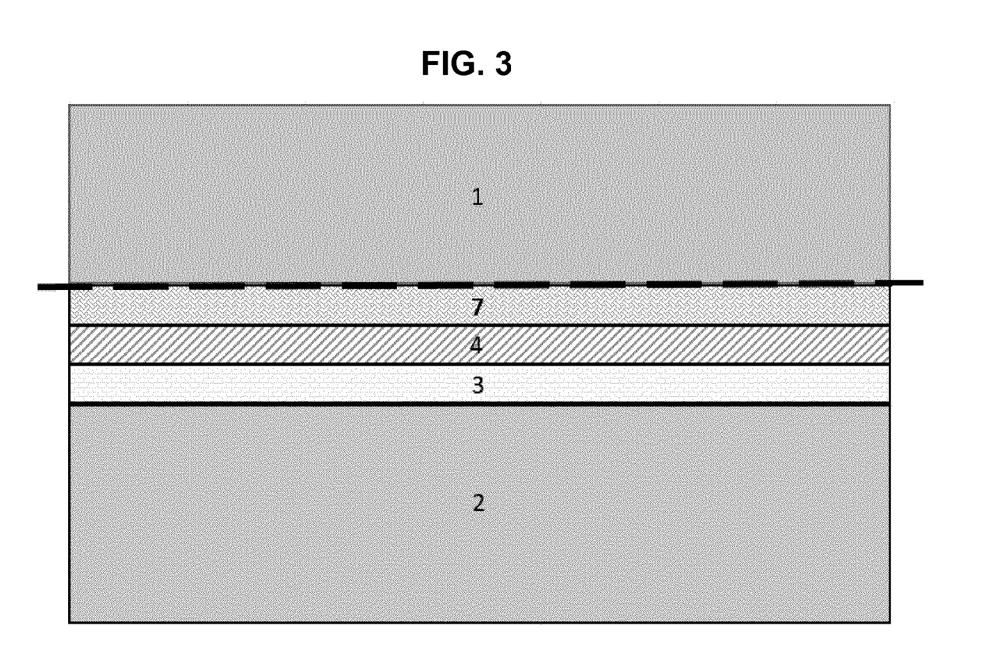
FIG. 3 shows an example of a laminate described herein. An example of such a laminate is described in detail in Example 3 below.

FIG. 3 shows an example of a laminate described herein. In this laminate, in comparison to the laminates of FIGS. 1 and 2, printing transparent electrostatic ink (7) replaces, respectively, the adhesive (5) and the heat sensitive layer (6), with all other layers being the same or similar as in FIGS. 1 and 2. Polymeric film (2) is coated with a primer (3), which is in turn, printed with an image (4) and these layers together represent an examples of a base material as described herein, on which the transparent electrostatic ink composition (7) is printed. Polymeric film (1), which represents an example of the substrate described herein, is pressed onto the transparent electrostatic ink under the application of heat and pressure. In some examples, the transparent electrostatic ink can be printed on desired parts of the top polymeric film (1) and functions as a heat sensitive layer. Applying a heat sensitive layer by electrostatic printing allows lamination without an additional adhesive coating process which would require a relatively long curing time. Printing the adhesive layer by electrostatic printing allows the laminate to be formed without a co-extrusion process in some cases and allows use of non-treated polymeric films as the top layer 1 of a laminate. More specific details of an example of the laminate are as follows.

The performance of commercially available HP Indigo Transparent Electroink as a digital adhesive for lamination was tested by creating a laminate as shown schematically in FIG. 3 by printing the transparent electroink (7) onto a sheet of primed and printed PET (2,3,4) as described below. HP Indigo Transparent Electroink is a electrostatic printing composition comprising particles of the resins Nucrel 699 (DuPont) and A-C 5120 (Honeywell) in the ratio of 4:1 (wt:wt) that encapsulate a charge adjuvant (aluminium stearate), suspended in Isopar, and containing a charge director (NCD, as mentioned above—although SCD could also be used).

The bottom polymeric (film) substrate (2) was PET (12 micron) from Polyplex Corporation. PET (2) was treated by a corona (1 kW) and coated by a commercial primer (3) (DP050 Michelman) using LaboCombi 400 laminator (Nordmeccanica) prior to printing an image (4). For testing various conditions, the primed substrate was cut into lab sheets that were mounted on a web prior to printing on them.

The sensitivity of the lamination strength to the ink coverage was tested by applying the disclosed ink on three different colored ink images (4). One layer of magenta ink simulated low ink coverage. Yellow, magenta, cyan and black layers printed on top of each other each with 66% coverage (YMCK(66% X4)) simulated high ink coverage. Yellow, magenta, cyan and black layers printed on top of each other each with 66% coverage with a white ink layer 100% coverage (YMCK(66% X4)+W(100%)) simulated extreme high ink coverage. One layer of transparent electroink (7) (ca. 1 μm) was printed on each of the 3 samples.

The top polymeric layer (1), of polyethylene (PE), was treated by corona (1 kW) prior to lamination. The PE was laminated on top of the printed PET (see FIG. 3). Lamination was performed in Semi-automatic Sealer Brugger HSC-s. The conditions for the lamination were: 200° C. upper jaw (printed PET side), 80° C. bottom jaw (PE side), dwell time 0.5 sec., pressure 600N).

Lamination bond strength was measured by Instron 210 Family Electromechanical Universal Test Machine. The lamination bond strength is tested by applying Test Method for Comparison of Bond Strength or Ply Adhesion of Similar Laminates Made from Flexible Materials (ASTM F0904-98R08).

The effect of the transparent ink is demonstrated in Table 1. The lamination strength is increased significantly upon printing a layer of transparent electroink as shown in FIG. 3. It is supposed that the absence of pigments in the transparent LEP ink improve the functionality of the transparent ink as heat sensitive layer.

TABLE 1

| Newtons/inch | YMCK(66%X4) | M(100%) | YMCK(66%X4) + W(100%) |
|---|---|---|---|
| Example 3 (with transparent electroink) | 5.1 | 5.1 | 5.83 |
| Reference (same as Example 3, but with no transparent electrostatic ink composition laye 7, i.e. just layers 2, 3, 4 and 1) | 2.14 | 1.83 | 1.6 |

The laminate of Example 3 compared favourably to those of Example 1 (where a Bond Strength of about 5 N/inch is expected), and Example 2 (where a Bond Strength of about 15 N/inch is expected).

The above example illustrates a very efficient way to create a laminate bearing a printed image. As can be seen from Reference Example 1, the use of liquid adhesive lamination is slow due to a long curing time. In addition, the adhesive is applied on the bottom polymeric film by an additional coating process. Thermal lamination, as illustrated in Reference Example 2, is faster, but still involves an additional process and apparatus to apply adhesive. Example 3 illustrates how an image layer and an adhesive layer may be applied in the same apparatus, and in quick succession, avoiding a long cure time of liquid adhesives, and still produce a laminate with reasonable lamination bond strength.

While the laminate (material), the method, and related aspects have been described with reference to certain examples, those skilled in the art will appreciate that various modifications, changes, omissions, and substitutions can be made without departing from the spirit of the disclosure. It is intended, therefore, that the process, laminate and related aspects be limited by the scope of the following claims. The features of any dependent claim can be combined with the features of any of the other dependent claims, and any independent claim.

The invention claimed is:
1. A process for preparing a laminate, comprising:
directly electrostatically printing an image layer on a precursor base material to form a base material, wherein the precursor base material is selected from the group consisting of paper, metallic foil, and polymeric film;
electrostatically printing a transparent electrostatic ink composition directly onto the image layer of the base material, wherein the transparent electrostatic ink composition comprises:
a thermoplastic resin selected from the group consisting of ethylene acrylic acid copolymers; ethylene methacrylic acid copolymers; ethylene vinyl acetate copolymers; copolymers of ethylene and C1 to C5 alkyl ester of methacrylic or acrylic acid; copolymers of ethylene, acrylic or methacrylic acid, and C1 to C5 alkyl ester of methacrylic or acrylic acid; ethylene ethyl acrylate;
ethylene-acrylic esters-maleic anhydride terpolymers; ethylene-acrylic esters-glycidyl methacrylate terpolymers; ethylene-acrylic acid ionomers, and combinations thereof, a saccharide or a modified saccharide dispersed in the thermoplastic resin, and a charge adjuvant and/or a charge director;

providing a substrate; and contacting the substrate with the transparent electrostatic ink composition while the thermoplastic resin is softened or molten, and then allowing the thermoplastic resin to harden, so that the transparent electrostatic ink composition adheres the base material and the substrate together.

2. The process for preparing a laminate according to claim 1, wherein an electrostatic ink composition comprising a colorant, a thermoplastic resin, and a charge adjuvant and/or a charge director is electrostatically printed to form the image layer.

3. The process for preparing a laminate according to claim 1, wherein the precursor base material comprises the polymeric film and the substrate comprises a second polymeric film.

4. The process for preparing a laminate according to claim 1, wherein at least one of the precursor base material and the substrate is transparent.

5. The process for preparing a laminate according to claim 1, wherein at least one of the precursor base material and the substrate comprises a film of biaxially oriented polypropylene or poly(ethylene) terephthalate.

6. The process for preparing a laminate according to claim 1, wherein the laminate is a flexible packaging material.

7. The process for preparing a laminate according to claim 1, wherein the saccharide or the modified saccharide is present in an amount ranging from greater than about 15 wt % to less than about 60 wt % of non-volatile solids in the transparent electrostatic ink composition.

8. The process for preparing a laminate according to claim 1, wherein the saccharide or the modified saccharide is selected from the group consisting of maltose monohydrate, sucrose, sucrose octanoate, sucrose octaacetate, dextrin, xylitol and sucrose benzoate.

* * * * *